United States Patent Office 3,230,038
Patented Jan. 18, 1966

3,230,038
STORAGE STABILITY OF AMMONIUM NITRATE
Joseph F. Wilson, Bartlesville, Okla., assignor to Phillips Petroleum Company, a corporation of Delaware
No Drawing. Filed May 4, 1962, Ser. No. 192,352
11 Claims. (Cl. 23—103)

This invention relates to improving the storage stability of ammonium nitrate. In another aspect, it relates to a method of treating particulate ammonium nitrate with a coating agent to reduce the normal tendency of ammonium nitrate to swell and cake on standing. In another aspect, it relates to coated ammonium nitrate, which material has a reduced tendency to swell and is relatively free-flowing, such coated salt being useful as a fertilizer and in explosive compositions. In a further aspect, it relates to a novel two-component agent, useful in coating such salts as ammonium nitrate and to a method of preparing such agent.

Ammonium nitrate in powder, crystalline, or granular form has a normal tendency to undergo volume changes during storage. For example, ammonium nitrate is known to have five crystalline phases within the temperature range of −50 to 130° C. at one atmosphere pressure. These phases are: phase V, below −18° C.; phase IV, from −18 to 32° C.; phase III, from 32 to 84° C.; phase II, from 84 to 125° C.; and phase I, from 125 to 175° C. (the melting point). Ammonium nitrate is generally stored under varying temperature conditions, for example −10° C. and lower in winter to temperatures as high as 40° C. and higher in summer. As seasonal and daily temperature changes occur, the salt may be in any one of several different phases, the transitions from one phase to another causing changes in volume of the salt. Where the salt is stored in bags, it is not uncommon to find that such bags have burst due to the swelling or increased volume occasioned by subjection of the bagged product to fluctuations in temperature. The bursting of such bags is of course undesirable since it may result in loss of the salt, damage to surroundings, etc. Similarly, where ammonium nitrate is used as the oxidizer component in composite type solid propellants, such as those where the ammonium nitrate is dispersed in a rubbery polymer binder, grains of such propellant will sometimes crack or crumble internally under temperature variations due to the volume change which accompanies the change in structure from one phase to another.

Another problem commonly associated with ammonium nitrate is its normal tendency to cake or become sticky on standing and form hard masses. This caking is usually attributable to changes in humidity, temperature, and/or pressure, and occurs under conditions during storing, shipping and handling. Caking of the salt presents difficulties in its handling, for example, where the salt is used as fertilizer, this caking tendency impairs the drillability of the fertilizer and increases the cost of uniformly distributing the fertilizer in the field because the caked fertilizer causes clogging of the distribution machine and many other problems. Also, where ammonium nitrate is used as an ingredient in explosive compositions, the caking tendency of such salt can adversely affect the sensitivity of said explosive composition, and may render it incapable of satisfactory detonation.

Many methods have been proposed, used or patented in the past for improving the storage stability of ammonium nitrate, including treatment of the salt with various conditioning agents to prevent caking. While some of these methods and prior art conditioning agents have been satisfactory in providing some measure of storage stability, others have proven unsatisfactory, particularly with respect to swelling.

Accordingly, an object of this invention is to improve the storage stability of ammonium nitrate. Another object is to provide an improved method of coating ammonium nitrate to reduce its normal tendency to exhibit volume changes and cake on standing. Another object is to produce a coated ammonium nitrate product, which product is valuable as a free-flowing fertilizer with little or no tendency to swell and cake on standing. Another object is to provide improved explosive compositions containing coated ammonium nitrate, which explosive compositions are characterized by satisfactory sensitizing and detonating properties. A further object is to provide a novel material useful as a conditioning agent for salts that tend to cake and/or swell, and method for preparing such material. Further objects and advantages of this invention will become apparent to those skilled in the art from the following discussion and appended claims.

I have now discovered that the storage stability of ammonium nitrate can be improved by coating particles of the same with a novel coating agent comprising a major amount of attapulgite and a minor amount of an alkali metal salt of an alkylaryl sulfonic acid, said coating agent hereafter occasionally referred to as the novel two-component coating agent of this invention.

Attapulgite, used as the major component of the coating agent of this invention, is a clay which is unique among clay minerals in that its structure is chain-like or fibrous and it exhibits a very different geometry from the platy minerals. Furthermore, when compared to other clays, attapulgite has a high magnesium content, as evidenced by the following typical attapulgite analysis:

TABLE I

| Component: | Amount, wt. percent |
|---|---|
| $SiO_2$ | 55.03 |
| $Al_2O_3$ | 10.24 |
| $Fe_2O_3$ | 3.53 |
| MgO | 10.49 |
| $K_2O$ | 0.47 |
| $H_2O$ removed at 150° C. | 9.73 |
| $H_2O$ removed at higher temperature | 10.13 |

Attapulgite is sold as an article of commerce under various trade marks, such as Attasorb (1 to 14 microns, averaging 4 microns), Attacote (1 to 33 microns, averaging 6 microns), and Attaclay (5 to 80 microns, averaging 25 microns).

The alkyl aryl sulfonates, employed in a minor amount as the other essential component of the novel coating agent of this invention, are water-soluble alkali metal salts of alkyl aryl sulfonate acids which have a total of 7 to 30, preferably 10 to 20, carbon atoms per molecule with preferably 1–4 of these carbon atoms in each of the aliphatic hydrocarbon chains. The aryl portion of these compounds can be either benzene or naphthalene nucleus. These sulfonates can be prepared by the well-known procedure of sulfonating the corresponding alkyl aromatic compound and forming the alkali metal salt of the resulting sulfonic acid.

Representative alkyl aryl sulfonates useful in the practice of this invention include the sodium salt of 2-n-butylbenzenesulfonic acid; the sodium salt of 3-tert-dodecylbenzensulfonic acid; the potassium salt of 4-n-eicosylbenzenesulfonic acid; the potassium salt of 4-n-tetradecylbenzenesulfonic acid; the lithium salt of 4-tetracosylbenzenesulfonic acid; the disodium salt of 6-n-decylbenzene-p-disulfonic acid; the disodium salt of dimethylnaphthalene-1,2-disulfonic acid; the trirubidium salt of 5-tert-hexadecylbenzene-2,4,6-trisulfonic acid; the sodium salt of methylnaphthalenesulfonic acid, such as the sodium salts of 1-methylnaphthalene-2-sulfonic acid, 1-methylnaphthalene-4-sulfonic acid, and mixtures thereof; the sodium salt of 6-n-eicosylnaphthalene-1-sulfonic acid; the trisodium salt of 6,7,8-triethylnaphthalene-1,2,3-trisulfonic acid; the discesium salt of 2,5 - dimethylbenzene, 1,3-disulfonic acid; the disodium salt of 4,6-di-n-decylnaphthalene 1,8-disulfonic acid; the potassium salt of 7-tert-dodecylnaphthalene-2-sulfonic acid; the sodium salt of 2,5-dimethylbenzenesulfonic acid; and the like, including mixtures thereof. Of these respective sulfonates, the sodium salts of methylnaphthalenesulfonic acid and dimethylnaphthalenesulfonic acid are preferred, such materials being commercially available.

Both of the components of the novel coating agent of this invention are solids and are inert with respect to the ammonium nitrate. The sulfonates are water soluble compounds which may be used in particulate form in treating the nitrogen-containing salts, or applied in a hydrocarbon or an aqueous solution, for example, a 5 to 75 weight percent solution, preferably about a 50 weight percent solution. Said sulfonates are also characterized by the fact that they are not dyestuffs.

The ammonium nitrate, in particulate form, is treated with an amount of the novel two-component coating agent of this invention sufficient to improve the storage stability of the ammonium nitrate, preferably 1 to 3 weight percent. Generally, only a small amount of the coating agent is necessary to provide adequate protection against swelling and caking, with amounts in the range of 0.5 to 5 weight percent of the treated ammonium nitrate being generally applicable. As mentioned hereinbefore, the attapulgite component comprises a major amount of the coating agent, while the sulfonate component comprises a minor portion of the coating agent. Generally, for most applications, the amount of the sulfonate component in the coating agent will be usually within the range between 0.5 to 15 weight percent, preferably in the narrow range between 1 to 10 weight percent, of the coating agent. Thus, when the coating agent is applied to the ammonium nitrate, the amount of sulfonate component in the coating can be exceedingly small, e.g., 0.01 weight percent of the treated ammonium nitrate. The use of this small amount of this sulfonate on the ammonium nitrate is advantageous in that it does not significantly reduce the nitrogen content of the treated salt and make such treated salt economically unattractive to a farmer who is interested in getting as much plant nutrient value as possible out of the ammonium nitrate used as a fertilizer.

The attapulgite can be dried before being admixed with the sulfonate, or the two-component mixture can be subsequently dried after mixture, or both methods of drying can be used. Which ever drying method is used, the final coating product will normally contain from 0.5 to 8 weight percent water, preferably 1 to 4 weight percent water. This novel mixture is then applied to the particulate ammonium nitrate by coating the same therewith, for example by tumbling or other equivalent methods. Generally, the attapulgite used will have a particle size from 0.2 to 80 microns, preferably more than 90 percent in the range of 1 to 25 microns. The treated or coated ammonium nitrate will generally have a moisture content not greater than 0.30 weight percent, preferably less than 0.20 weight percent. In most instances the treated ammonium nitrate can be subsequently dried further if necessary, or if desired.

I have surprisingly discovered that the coating of the ammonium nitrate with the novel two-component coating agent of this invention reduces both the swelling and normal caking tendency of the salt to a much greater extent than when the salt is treated with either the sulfonate itself, or the attapulgite itself. Whereas the sulfonate itself is not effective in reducing the swelling and caking tendency of the ammonium nitrate when the latter is treated with the sulfonate, and whereas attapulgite used by itself does not materially reduce the caking tendency of the ammonium nitrate when the same is treated with the attapulgite, the combination of the major amount of attapulgite with the minor amount of sulfonate, according to this invention, overcomes both the normal tendency of the ammonium nitrate to swell and its normal tendency to cake on standing. It takes only a relatively small amount of the coating agent of this invention to materially lower the swelling and caking tendencies of the ammonium nitrate.

As mentioned hereinbefore, the treated ammonium nitrate is useful in explosive compositions where such salts are used in admixture with combustible carbonaceous material. Generally, the explosive compositions of this invention will contain a major amount of the hereindescribed treated ammonium nitrate as oxidizer, and a minor amount of combustible carbonaceous material. Usually this will be in the range between 93 to 98 weight percent of the treated ammonium nitrate and 2 to 7 weight percent of the carbonaceous material. The combustible carbonaceous material employed in preparing these novel explosive compositions include any of those proposed or used heretofore. In particular, the combustible carbonaceous materials I prefer to employ are paraffinic hydrocarbons boiling in the range between 350 and 725° F., with an API gravity of from 20 to 60, and a viscosity of 25 to 140 SUS at 100° F. A specific combustible carbonaceous material of this type is diesel fuel. Other known solid combustible carbonaceous materials which can be employed include ground walnut hulls, asphalt, pitch, kerosene, coal tar, and the like. Liquid combustible carbonaceous materials are preferred.

Although the novel two-component coating agent of this invention when used by itself is sufficient to satisfactorily reduce or prevent the normal swelling and caking tendencies of ammonium nitrate treated therewith, it is also within the scope of this invention to utilize other known coating agents in combination with the two-component agent of this invention.

The objects and advantages of this invention are further illustrated by the following examples, but it should be understood that the various materials, amounts, temperatures, and other details of these examples are illustrative of preferred embodiments of this invention and these examples should not be construed to limit unduly this invention.

*Examples*

A number of runs were carried out in which the sodium salt of a methylnaphthalene sulfonic acid (Petro-Ag) was admixed with attapulgite (Attasorb) to prepare the novel coating agent of this invention, after which prills of ammonium nitrate were coated with said coating agent to reduce the normal tendencies of the ammonium nitrate to swell and cake on standing.

In each of these runs, a 50 weight percent aqueous solution of said sulfonate was admixed with the attapulgite in an amount sufficient to provide a sulfonate-attapulgite mixture containing a certain amount of said sulfonate. Rapid agitation was employed to ensure homogenity, and the mixture was then dried. The dried two-component coating agent was then tumbled onto the ammonium nitrate prills for approximately 10 minutes. The moisture content of the treated prills was then determined, after which the coated prills were then evaluated to determine the extent of swelling and caking.

Similar runs were carried out in which ammonium nitrate prills were coated individually for purposes of comparison with the sulfonate per se and with the attapulgite per se. Uncoated ammonium nitrate prills were also evaluated.

To evaluate swelling, the samples of the ammonium nitrate were placed in small glass vials after which the vials were tightly sealed by capping. The vials were then subjected to temperature cycling between 38 and 115° F.; each time the temperature was elevated to 115° F. it was counted as one temperature change. Thus, the full cycle of from 38 to 115° F. and back to 38° F. is considered as two temperature changes. The volume increase of the ammonium nitrate in each vial was measured by measuring the level of the ammonium nitrate in the vial with a meter stick. Since the diameter of the vial was constant, an increase in height of the ammonium nitrate in the vial is directly proportional to volume increase.

The tendency of the ammonium nitrate samples to cake on standing was evaluated by a "cake test," a procedure which is a modification of that described in Ind. and Eng. Chem. 33, 121–127 (1941). In the "cake test," 65 g. portions of the ammonium nitrate was poured into polyethylene cylinders fabricated of two layers of 1.5 mil wall thickness polyethylene. The inside diameter of the cylinders was 1⅞ in., and the ends of the cylinders were blocked with lucite blocks ½ in. thick and 1⅛ in. in diameter. The blocks were held in the cylinders by means of cellophane tape. The loaded cylinders were then placed in a brass mold containing three holes, each 4 in. deep 2 in. in diameter. A bellows was then attached to the top of the mold so as to supply 24 p.s.i. air pressure to the ammonium nitrate particles in the cylinders. The entire arrangement was then placed in an oven which was fitted with both heating and cooling means. The samples were then heated from 50 to 140° F. and maintained 13 hrs., after which the samples were cooled to 50° F. over a 3 hr. period. The full cycle of from 50 to 140° F. and back to 50° F. required 6 hrs., and this cycle was carried out three times, requiring a total time of 18 hrs. for three full cycles. The samples were then removed from the oven and let stand until they reached room temperature. The ammonium nitrate cakes which had formed were then removed from the cylinders, and the cakes were tested to breaking or crushing in a Carver commercial press. The total pounds required to break each cake was recorded, and since the corresponding sectional area of each cake was 2.75 sq. in., the breaking pressure in p.s.i. was calculated and recorded. Where this procedure resulted in ammonium nitrate samples which did not cake but rather were free-flowing, these samples were designated "FF." And where the procedure resulted in ammonium nitrate cakes which collapsed upon subjection to initial pressure (i.e., less than 10 p.s.i.) in the Carver press before a pressure reading could be noted, such examples were designated as "LB" to denote light bridging and collapse of the cakes to free-flowing prills.

Data for the swelling and cake test and the results obtained by these procedures are set forth in Table II.

prisingly effective in materially reducing the normal tendencies of the ammonium nitrate to swell and cake on standing, especially when compared to the runs where the ammonium nitrate is coated with only the sulfonate (Runs 3 and 4) or only with the attapulgite (Runs 5–7).

Various modifications and alterations of this invention will become apparent to those skilled in the art without departing from the scope and spirit of this invention, and it should be understood that this invention is not to be limited unduly to that set forth herein for illustrative purposes.

I claim:

1. A method for improving the storage stability of particulate ammonium nitrate, which comprises coating said ammonium nitrate with a material which comprises, as the sole essential storage stability agent, an admixture of a major amount of attapulgite and a minor amount of an alkali metal salt of an alkylaryl sulfonic acid, said agent being employed in an amount sufficient to improve the storage stability of said ammonium nitrate.

2. The method according to claim 1, wherein the amount of said agent on the ammonium nitrate is 0.5 to 5 weight percent, and said alkali metal salt amounts to about 0.5 to 15 weight percent of said agent.

3. The method according to claim 1 wherein the amount of said agent on the ammonium nitrate is 1 to 3 weight percent, and said alkali metal salt amounts to about 1 to 10 weight percent of said agent.

4. A method according to claim 1 wherein said alkylaryl sulfonic acid has a total of 7 to 30 carbon atoms per molecule, and where the aryl portion of the molecule is selected from the group consisting of benzene and naphthalene groups.

5. A method according to claim 4 wherein said alkali metal salt is the sodium salt of an alkylbenzene sulfonic acid.

6. A method according to claim 4 wherein said alkali metal salt is the sodium salt of an alkylnaphthalene sulfonic acid.

7. A method according to claim 1 wherein said alkylaryl sulfonic acid salt is the sodium salt of methylnaphthalene sulfonic acid.

8. A method according to claim 1 wherein said alkylaryl sulfonic acid salt is the sodium salt of dimethylnaphthalene sulfonic acid.

9. As a new composition of matter, particulate ammo-

TABLE II

| Run | Water content of nitrate, wt. percent | Coating agent | Amount of coating agent on nitrate, wt. percent | Crushing strength of coated nitrate, p.s.i. | Swelling of coated nitrate | |
|---|---|---|---|---|---|---|
| | | | | | Percent swell | No. of temp. changes |
| 1 | 0.15 | None | 0 | >200 | 62 | 21 |
| 2 | 0.15 | ----do---- | 0 | | 66.7 | 21 |
| 3 | 0.10 | Sulfonate | 0.03 | 310 | 42 | 20 |
| 4 | 0.11 | ----do---- | 0.1 | 200 | 16.7 | 20 |
| 5 | 0.15 | Attapulgite | 1.0 | 280 | 10 | 21 |
| 6 | 0.16 | ----do---- | 2.0 | 160 | 9 | 20 |
| 7 | 0.23 | ----do---- | 3.0 | 130 | 9 | 21 |
| 8 | 0.17 | Attapulgite+1 wt. percent sulfonate | 1.0 | 110 | 10 | 21 |
| 9 | 0.18 | ----do---- | 2.0 | LB [1] | 10 | 21 |
| 10 | 0.14 | Attapulgite+2 wt. percent sulfonate | 1.0 | LB | 13.5 | 21 |
| 11 | 0.16 | ----do---- | 2.0 | FF [2] | 11.1 | 21 |
| 12 | 0.12 | Attapulgite+3 wt. percent sulfonate | 0.5 | 300 | 12 | 21 |
| 13 | 0.17 | ----do---- | 0.75 | 260 | 10 | 21 |
| 14 | 0.14 | ----do---- | 0.75 | LB | 13.3 | 21 |
| 15 | 0.17 | ----do---- | 1.0 | LB | 12 | 21 |
| 16 | 0.16 | ----do---- | 1.0 | LB | 9 | 20 |
| 17 | 0.18 | ----do---- | 2.0 | FF | 8.5 | 21 |
| 18 | 0.17 | ----do---- | 2.0 | FF | 2 | 20 |
| 19 | 0.19 | ----do---- | 3.0 | FF | 5 | 21 |
| 20 | 0.17 | ----do---- | 3.0 | FF | 2 | 21 |
| 21 | 0.14 | Attapulgite+5 wt. percent sulfonate | 1.0 | LB | 13.7 | 21 |
| 22 | 0.15 | ----do---- | 2.0 | FF | 11.3 | 21 |
| 23 | 0.13 | Attapulgite+10 wt. percent sulfonate | 1.0 | LB | 11.8 | 21 |
| 24 | 0.18 | ----do---- | 2.0 | FF | 12.1 | 21 |

[1] LB=light bridging of cake, readily collapsed to free-flowing prills.
[2] FF=free-flowing prills.

The data of Table II show that the novel two-component coating agent of this invention (Runs 8–24) is surnium nitrate coated with a material which comprises, as the sole essential storage stability agent, an admixture of a major amount of attapulgite and a minor amount of an alkali metal salt of an alkylaryl sulfonic acid, the amount of said agent on the ammonium nitrate being sufficient to improve the storage stability of the ammonium nitrate.

10. As a new composition of matter, particulate ammonium nitrate coated with 0.5 to 5 weight percent of a coating agent consisting essentially of attapulgite and 0.5 to 15 weight percent of the sodium salt of an alkylaryl sulfonic acid having a total of from 7 to 30 carbon atoms per molecule wherein the aryl portion of said molecule is selected from the group consisting of benzene and naphthalene groups.

11. A new composition of matter according to claim 10 wherein said alkylaryl sulfonic acid is a methylnaphthalene sulfonic acid.

References Cited by the Examiner

UNITED STATES PATENTS

| | | | |
|---|---|---|---|
| 2,399,987 | 5/1946 | Cordie et al. | 23—103 |
| 2,616,786 | 11/1952 | Whetstone | 23—103 |
| 2,644,769 | 7/1953 | Robinson | 23—103 X |
| 2,647,047 | 7/1953 | Richardson | 149—6 |
| 2,720,446 | 10/1955 | Whetstone et al. | 23—103 |
| 2,739,036 | 3/1956 | Kamenjar et al. | 23—103 |
| 2,794,701 | 6/1957 | Ames et al. | 23—103 |
| 3,013,872 | 12/1961 | Winchell | 149—7 |
| 3,034,858 | 5/1962 | Vives | 23—103 |
| 3,039,903 | 6/1962 | Enokson | 149—7 |
| 3,116,185 | 12/1963 | Wilson et al. | 23—103 X |
| 3,143,410 | 8/1964 | Smith | 23—103 X |

MAURICE A. BRINDISI, *Primary Examiner.*